May 15, 1962 N. J. LYNCH 3,034,245
DUCK CALLER AND DECOY
Filed Feb. 12, 1960 2 Sheets-Sheet 1

Neal J. Lynch
INVENTOR.

BY *Clarence A. O'Brien*
*and Harvey B. Jacobson*
Attorneys

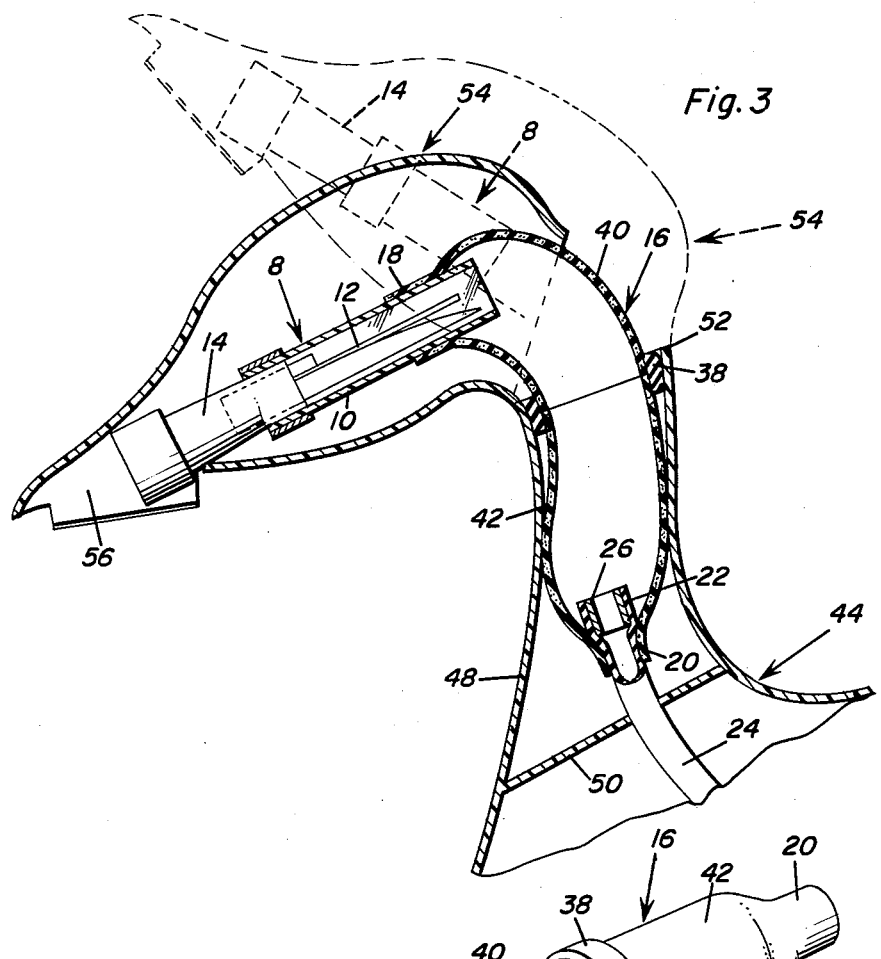
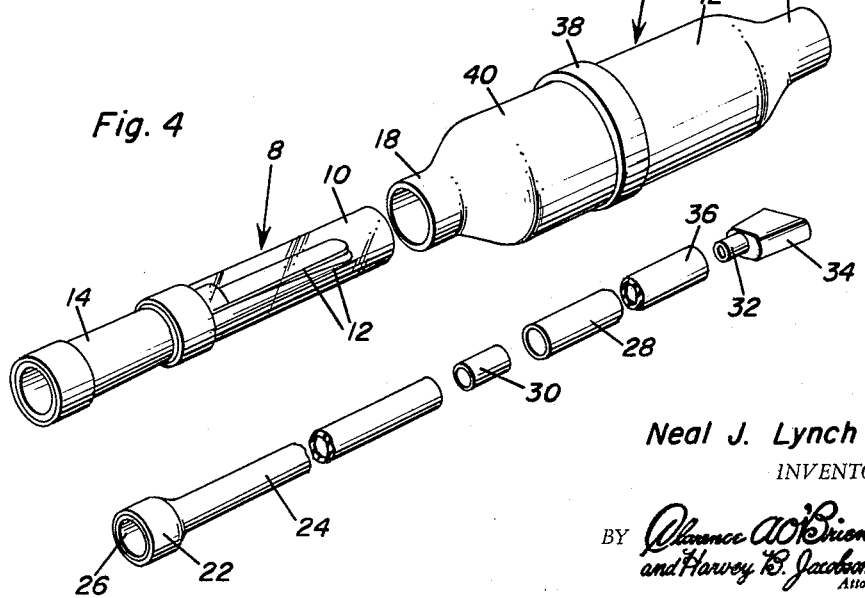

United States Patent Office 3,034,245
Patented May 15, 1962

3,034,245
DUCK CALLER AND DECOY
Neal J. Lynch, St. Paul, Nebr.
Filed Feb. 12, 1960, Ser. No. 8,413
6 Claims. (Cl. 43—3)

This invention relates to wild animal and bird calls, generally speaking, but more specifically, to a goose and duck caller which is utilized in a unique manner with a view toward attracting the prey in an unusual and incredibly satisfactory manner, much to the delight and approval of game hunters.

As the preceding statement implies, it is not the call by itself which is of import, but the special devices used in conjunction therewith which constitute an advance in the art herein under advisement. For example, one aspect of the concept has to do with novel means whereby the duck hunter, hidden in a blind or elsewhere, is enabled to operate the call, a conventional type, at will and at a distance from the remotely located call. It has been found that this use of the art of deception entices and lures the prey to a desired spot for acceptable aiming and shooting. In fact, and as a result of much experimental work, highly pleasing and satisfactory results have been proved, over and over.

Although many different solutions to the problem have been explored, the ways and means herein revealed have been chosen for best results. To this end, instead of attaching a long hose or conduit directly to the mouthpiece of the caller, which did not function to best advantage, an air trapping reservoir having a bellows action has been adopted. More particularly, a practical and workable bulbous rubber or equivalent bladder is employed. This bladder, also sometimes referred to herein as an inflatable and deflatable air lung, has its discharge end communicatively connected to the mouthpiece of the caller, the distal or discharge end of the long hose being connected to the intake end of the bladder. Now then, by blowing up the bladder, similar to inflating a balloon, the trapped air enters the caller, causes the vibratory reeds to respond with the result that the desired blatant squawk emanates from the caller, in an obvious manner.

A mere glance at the views of the drawings will tend to suggest to the reader that the invention has to do with a decoy, that is, in addition to the remote controlled duck call. This is true. But, before touching upon this phase of the over-all concept, it should be first understood that a decoy is but a complemental component of the all inclusive combination. So, it is to be stressed, at the outset, that the bladder and hose equipped assembly (FIG. 5) may be used alone, may be incorporated in the improved decoy, or simply associated exteriorly or otherwise with some other form (not shown) of a decoy.

In carrying out the principles of this invention, it was found that any one of a number of marketed callers could be satisfactorily operated with a simple pump, for example, a squeeze-type compressibly resilient bulb. In some instances, there may be occasion to operate the caller by hand with a bulb attached thereto and in this connection the rubber or elastic bladder may be employed by itself, that is, attached to the mouthpiece of the caller, without having to place the caller in the user's mouth. By attaching the bladder to the caller, squeezing it to trap air, and then valving the outer end the air can be forced into the reed chamber of the caller and thus operated. But this is but one of the many objectives of the invention.

As before suggested, the primary attempt to reduce a practical embodiment of the invention to practice resulted in the construction of FIG. 5 wherein the discharge neck on the bladder has the caller fitted therein and the intake neck has the discharge end of an elongated hose connected thereto making it possible to place the caller on the ground at a desired remote point, attaching it to a tree limb, or stripping it on a decoy in the water with a rubber band or the like.

Since it was found that the association of the construction of FIGS. 4 and 5 could be used alone or in combination with a decoy, the idea has been carried further. That is to say, it is also an object of the invention to incorporate the component parts in an assembled form in the hollow sectional head and neck of a decoy. In this adaptation, the bladder when ballooned or expanded functions to rear the head of the decoy so that when the call is thereafter effected, the over-all result is more realistic and advantageous.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a view primarily in section but with parts in elevation detailing the parts and their construction and arrangement;

FIG. 4 is an exploded perspective view; and

Figure 2:
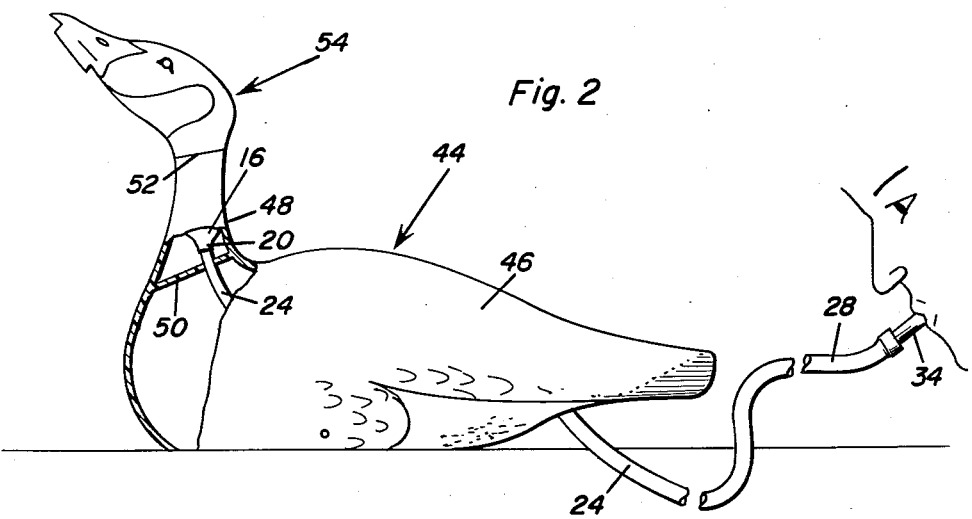
FIG. 2 is a view along the same lines but showing the mouthpiece of the hose being used by the hunter and illustrating the action of the movable head in its elevated or reared position.
Figure 5:
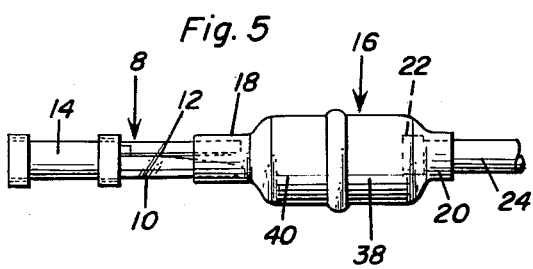
FIG. 5 is a view in elevation on a smaller scale showing the invention in its usable form when not attached to a decoy.

With reference now to FIGS. 4 and 5 in particular, the numeral 8 designates a commercial-type duck or goose call or caller having a mouthpiece 10 providing a chamber for the vibratory reeds 12. The tone discharge barrel or horn is denoted at 14. The elongated elastic bulbous bladder (mechanical air lung) is denoted at 16. This may be of any shape, size and properly performing elastic material, generally rubber. It may be of any cross-section, not necessarily that shown in FIG. 4. However, it is preferably elongated and at the leading or left hand end it is fashioned into a reduced or restricted discharge neck 18 which telescopically receives the mouthpiece 10 of caller 8. A similar restricted intake neck 20 is provided at the opposite end and this serves to accommodate the enlarged end portion 22 of the outermost hose section 24. If desired, a rigid collar 26 may be fitted into the end 22 in order to make a satisfactory air-tight connection between the parts as better shown in FIG. 3. Since the hose may be of any length, it is described as sectional and the inner section is denoted at 28 and the two sections are joined by separating coupling 30 of plastic or suitable material. The nipple 32 on the mouthpiece 34 is fitted into the end 36 of the hose and the mouthpiece is used in the manner illustrated at the right in FIG. 2. This mouthpiece may be of any construction and material. It should be preferably removable for storage, cleaning and handling. The hose too many be made of transparent plastic material and for easy assembling, repair and cleaning. Reverting to the expansible and contractible bladder 16 it has been found that in order to obtain a pitch which is first high and then low rather than one sustained tone, a snap-band or ring 38 may be successfully used. This band embraces the central part and may be used to join the two chamber-forming sections 40 and 42 as seen in FIG. 3. These sections 40 and 42 being of thin responsive rubber and the ring being of heavier rubber, the ring contracts the central portion and allows the end portion to balloon out. When, however, sufficient air is forced into the reservoir in the bladder, the ring is ultimately expanded and when released it snaps to its normal position quickly and gives a forcible impulse of air which acting on the call changes the tone or pitch and enables the call, even though remote controlled, to be more effectively employed.

As already touched upon, the bladder may be employed as an expansible and contractible joint in the decoy neck construction to add to the over-all efficiency of the invention. The decoy 44 may be assumed to be of any suitable construction and the one used at present is provided with a hollow body 46. The forward end of the body has a neck 48 reinforced at 50. The upper end of the neck is open at 52. The head, which is separate, is denoted at 54 and as best shown in FIG. 3, the bottom of the bill or beak is left open to provide a tone emitting slot or opening 56.

Figure 1:
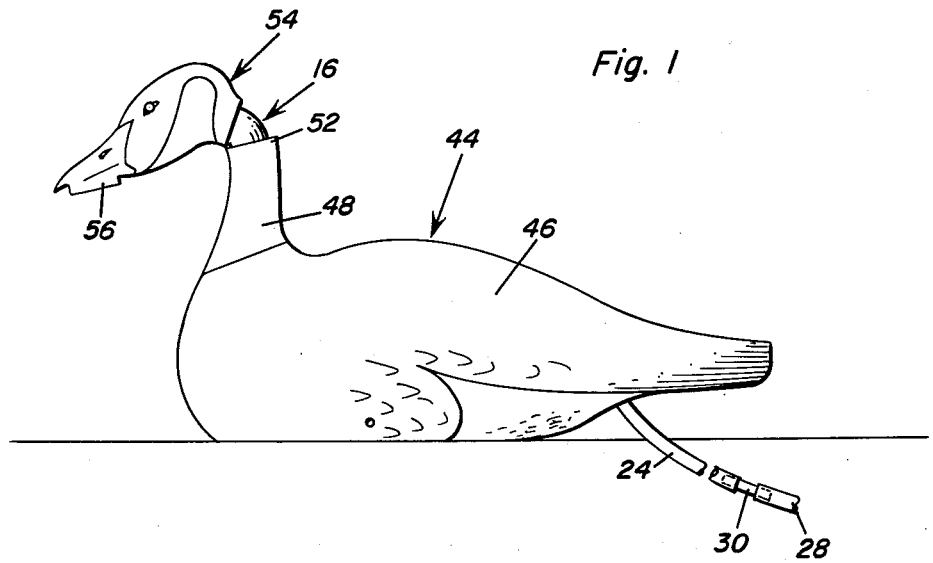
FIG. 1 is a view in side elevation showing the remote controlled caller incorporated or built-in a decoy wherein the head is separate from the neck and is capable of being lifted and lowered.

Since the neck and head portions are hollow the chambers or spaces thus available are utilized in the advantageous manner best seen in FIG. 3. Here it will be observed that at least one half portion, more-or-less, the portion 42, is telescopically stuffed into the socket portion of the neck. The other end portion protrudes through the opening 52 and bridges the gap seen in FIG. 3 and actually projects into the hollow portion of the head 54. This hollow portion also serves to accommodate the caller 8. With this arrangement, the erectile properties of the expanded bladder are called upon to raise and lower the head. Normally, and assuming that the bladder is deflated, the movable head drops down to the normal position depicted in FIG. 1. When air is forcibly shot from the hose line into the reservoir and the bladder is inflated it obviously performs the function of rearing the head up to the call position seen in FIG. 2 and the call is sounded simultaneously. This combination of ideas and the construction shown provide the combination utilizing the attractive and alluring properties of a decoy plus the call which emanates and renders the decoy more effective than would otherwise be the case.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, an elongated air conducting hose having a mouthpiece at the air inlet end, a duck caller having a reed-equipped body with an air intake mouthpiece, an elongated inflatable and deflatable rubber bladder providing a communicatable operating connection between the mouthpiece of said caller and the adjacent air discharge end of said hose, and a decoy having a hollow elongated neck terminating in a hollow head in which said caller and bladder are mounted to give the impression that the sound is emanating directly from the decoy's head.

2. In combination, a duck decoy having a body terminating in a neck, said neck being open at an upper end, a hollow head separate from an end of said neck with which it is cooperatively associated, said head having a sound emitting bill portion, an air responsive duck call built into and concealed in and aligned for sound emitting action with the sound emitting bill portion, an expansible and contractible elongated rubber bladder stuffed into the neck, emerging through the open end of the neck, telescoping into the adjacent cooperating end portion of the hollow of said head and operatively connected with said duck call, said bladder providing a flexibly resilient joint between the head and neck so that the head thereon is allowed to droop to assume a silent position and is forcibly raised and erected to a calling position when the bladder is inflated and distended, and an elongated hose having a remote controlled mouthpiece at the air intake end, the leading air discharge end being communicatively and operatively joined to the air intake of said bladder.

3. A duck caller comprising, in combination, an elongated expansible and contractible normally deflated rubber bladder constituting an artificial air lung and having a reduced open neck at one end permitting air to be introduced into the hollow portion of the bladder, and having the other end also provided with a reduced air discharging neck, an elongated rubber hose adapted to be operated from a concealed blind by a duck hunter and provided with a readily attachable and detachable mouthpiece, the end of said hose adjacent the intake neck of said bladder passing through said intake neck into the hollow portion of the bladder and the terminal end thereof being provided with a rigid collar which is fitted into said end in a manner to increase the cross section of said end and to couple the hose and bladder and at the same time to provide an airtight connection, and a conventional-type reed-equipped duck caller having a rigid mouthpiece at one end telescoping into the interior of the bladder by way of the aforementioned discharge neck, said discharge neck snugly and yieldingly encasing the mouthpiece and providing a separable but operating connection between the bladder and duck caller.

4. In combination, an expansible and contractible bladder made of readily responsive rubber and having a reduced air intake neck at on end, an air delivery hose having a discharge end communicatively joined to said intake neck, said bladder also having an air discharge neck at the other end, a conventional-type reed-equipped duck caller having a mouthpiece at one end operatively connected to said discharge end of said bladder and affording a separable but operable connection between the bladder and caller, the central portion of the bladder between the respective ends thereof having a relatively narrow but strong delayed-action elastic ring which transforms the bladder into readily expansible end chambers, requiring the user to inflate and first distend the chambers appreciably in order to subsequently stretch and expand the ring, whereby the ring, when the incoming air pressure from the hose has been checked, comes into play and contracts quickly and gives the overall bladder a sharp initial response and consequently causes the caller to give out a shrill squawk followed by a prolonged lower pitched tone, much in the same manner that the caller by itself would be handled and operated by a user thereof.

5. In combination, an elongated flexible air conducting hose having a rigid mouthpiece connected to the air inlet end of said hose, a reed-equipped caller having a body with a mouthpiece at its air intake end, and an inflatable and deflatable rubber bladder providing a communicatable operating connection between the mouthpiece of said caller and the adjacent air discharge end of said hose, and a decoy with which said caller is cooperatively associated, said decoy having a head and neck and said bladder having one end fitting into the neck and the other end fitting into the head.

6. In combination, a hollow duck decoy having a body with a hollow neck open at an upper end, a hollow head separate from said neck and having forward and rearward open ends, a reed-equipped air responsive duck call in the hollow of said head, an expansible and contractible elongated bladder constituting an air lung and having one end portion projecting into the hollow of the head and pneumatically and operatively connected to said duck call, its other end portion projecting into the hollow portion of said neck and its median portion bridging a limited space existing between the head and neck, said bladder being normally deflated and permitting the head to assume a normal at-rest position relative to the body and neck, and a remote-controlled flexible air pressure delivering conduit having a discharge end communicatively joined to the air intake end of said bladder, whereby when the bladder is inflated and the call is sounded, said head is lifted and cocked up to assume a call-indicating position.

References Cited in the file of this patent

UNITED STATES PATENTS

| | | |
|---|---|---|
| 1,110,245 | Vaughan | Sept. 8, 1914 |
| 2,583,400 | Wade | Jan. 22, 1952 |
| 2,782,558 | Harley | Feb. 26, 1957 |

FOREIGN PATENTS

| | | |
|---|---|---|
| 24,391 | Great Britain | Dec. 19, 1895 |